(12) United States Patent
Narusawa et al.

(10) Patent No.: US 7,224,811 B1
(45) Date of Patent: May 29, 2007

(54) AUDIO SYSTEM UTILIZING PERSONAL COMPUTER

(75) Inventors: Sadayuki Narusawa, Hamamatsu (JP); Hiromi Imura, Hamamatsu (JP); Shuichi Esaki, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 09/189,768

(22) Filed: Nov. 10, 1998

(30) Foreign Application Priority Data

Nov. 14, 1997 (JP) .................................. 9-313062

(51) Int. Cl.
*G06F 19/00* (2006.01)
(52) U.S. Cl. ..................................................... 381/119
(58) Field of Classification Search ................ 381/119, 381/98, 123, 104, 77; 700/94; 434/307, 434/308, 307 A, 307 R; 84/609–610; 713/320; 715/727–728
See application file for complete search history.

(56) References Cited

U.S. PATENT DOCUMENTS

| | | | |
|---|---|---|---|
| 4,635,288 A * | 1/1987 | Stadius | 381/119 |
| 4,879,751 A * | 11/1989 | Franks et al. | 381/119 |
| 5,212,733 A * | 5/1993 | DeVitt et al. | 381/119 |
| 5,283,819 A * | 2/1994 | Glick et al. | 379/90 |
| 5,390,138 A * | 2/1995 | Milne et al. | 381/119 |
| 5,402,501 A * | 3/1995 | Silfvajt et al. | 381/119 |
| 5,471,539 A * | 11/1995 | Flum et al. | 381/119 |
| 5,487,067 A | 1/1996 | Matsushige | |

(Continued)

FOREIGN PATENT DOCUMENTS

EP        0743766        11/1996

(Continued)

OTHER PUBLICATIONS

Leary, K., "The personal sound system," Electro/94 International Conference Proceedings, Combined Volumes, Boston, MA USA May 10-12, 1994, pp. 299-303.

(Continued)

*Primary Examiner*—Vivian Chin
*Assistant Examiner*—Lun-See Lao
(74) *Attorney, Agent, or Firm*—Pillsbury Winthrop Shaw Pittman LLP (57) ABSTRACT

An audio system is constructed by a personal computer and an audio device, which are connected together by way of a serial bus such as a universal serial bus (USB), for example. The audio device such as an audio component stereo system provides at least one audio source such as the tuner and recording media, which provides first audio data representing music or else. The personal computer uses graphical user interface (GUI) for controlling operation of the audio data, wherein it provides control data and second audio data representing message sounds, which are transmitted to the audio device via the serial bus. Thus, the audio device performs mixing between the first audio data and second audio data on the basis of the control data. Then, speakers produce sounds based on mixing result. The audio device is equipped with an analog mixing circuit, which performs analog mixing between analog signals corresponding to the first and second audio data respectively. Or, the audio device is equipped with a digital mixing circuit, which performs digital mixing between the first and second audio data. Thus, the user is capable of hearing the message sounds while listening to the music provided from the audio source of the audio device, for example.

18 Claims, 4 Drawing Sheets

U.S. PATENT DOCUMENTS

| | | | |
|---|---|---|---|
| 5,518,408 A * | 5/1996 | Kawashima et al. | 434/307 A |
| 5,524,060 A * | 6/1996 | Silfvast et al. | 381/104 |
| 5,557,683 A | 9/1996 | Eubanks | |
| 5,608,807 A | 3/1997 | Brunelle | |
| 5,647,008 A | 7/1997 | Farhangi et al. | |
| 5,657,221 A * | 8/1997 | Warman et al. | 364/188 |
| 5,774,567 A * | 6/1998 | Heyl | 381/119 |
| 5,787,259 A * | 7/1998 | Haroun et al. | 709/253 |
| 5,792,971 A * | 8/1998 | Timis et al. | 84/609 |
| 5,832,024 A * | 11/1998 | Schotz et al. | 375/200 |
| 6,007,228 A * | 12/1999 | Agarwal et al. | 700/94 |
| 6,022,223 A * | 2/2000 | Taniguchi et al. | 434/307 |
| 6,061,411 A * | 5/2000 | Wooten | 375/372 |
| 6,092,119 A * | 7/2000 | Rossmere et al. | 709/247 |
| 6,286,063 B1 * | 9/2001 | Bolleman et al. | 710/62 |
| 6,301,513 B1 * | 10/2001 | Divon et al. | 700/94 |
| 6,314,326 B1 * | 11/2001 | Fuchu | 700/17 |
| 6,492,909 B1 * | 12/2002 | Washikawa et al. | 340/825.25 |

FOREIGN PATENT DOCUMENTS

| | | |
|---|---|---|
| JP | 61 136309 | 8/1986 |
| JP | 60 181454 | 2/1987 |
| JP | 62 21621 | 2/1987 |
| JP | 62 040843 | 2/1987 |
| JP | 4 124728 | 11/1992 |
| WO | WO 97 37202 | 10/1997 |
| WO | WO 9737202 | 10/1997 |

OTHER PUBLICATIONS

"Programmable Computer Stereo System for Multi-Media Systems," IBM Technical Disclosure Bulletin, IBM Corp., vol. 35, No. 1A, Jun. 1, 1992, pp. 408-411.

* cited by examiner

AUDIO SYSTEM UTILIZING PERSONAL COMPUTER

BACKGROUND OF THE INVENTION

1. Field of the Invention

This invention relates to audio systems that are configured by connecting computers such as personal computers (PCs) and portable computers to audio devices such as audio component stereo sound systems equipped with speakers.

This application is based on Patent Application No. Hei 9-313062 filed in Japan, the content of which is incorporated herein by reference.

2. Description of the Related Art

According to the general configuration method employed by the audio system that is configured by connecting the personal computer (or PC) and audio device, output of a sound board of the personal computer is merely connected to an external input terminal of the audio device. In that method, the personal computer is placed as one source of the audio device. For this reason, when the audio device selects another source such as a FM tuner and a CD player, the audio device cannot reproduce audio signals from the personal computer. In this case, a user of the audio device cannot hear alarm sound and/or sound to inform receipt of electronic mail given from the personal computer. The aforementioned audio system is designed to employ a simple configuration that the personal computer merely outputs analog audio signals to the audio device. Such a configuration is incapable of effectively interconnecting (or interlocking) the personal computer with the audio device.

SUMMARY OF THE INVENTION

It is an object of the invention to provide an audio system in which an audio device is capable of reproducing audio data given from a personal computer without troubles even if the audio device selects a source other than the personal computer.

It is another object of the invention to provide an audio system that is capable of effectively interconnecting (or interlocking) the personal computer with the audio device.

An audio system of this invention is constructed by a personal computer and an audio device, which are connected together by way of a serial bus such as a universal serial bus (USB), for example. The audio device such as an audio component stereo system provides at least one audio source such as a tuner and a recording media, which provides first audio data representing music or else. The personal computer uses graphical user interface (GUI) for controlling operation of the audio data, wherein it provides control data and second audio data representing message sounds, which are transmitted to the audio device via the serial bus. Thus, the audio device performs mixing between the first audio data and second audio data on the basis of the control data. Then, speakers produce sounds based on mixing result.

In one aspect of the invention, the audio device is equipped with an analog mixing circuit, which performs analog mixing between analog signals corresponding to the first and second audio data respectively. Herein, signal processing (e.g., graphic equalizer process and/or sound field control process) is performed on one of the first and second audio data, which is selected according to needs. Then, the analog mixing is performed between first analog signals corresponding to signal processing result and second analog signals corresponding to the second audio data. When the signal processing is selectively performed on the second audio data, it is possible to disconnect supply of the second analog signals to the analog mixing circuit.

In another aspect of the invention, the audio device is equipped with a digital mixing circuit, which performs digital mixing between the first and second audio data.

Thus, the user is capable of hearing the message sounds while listening to the music provided from the audio source, for example.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

Figure 1:
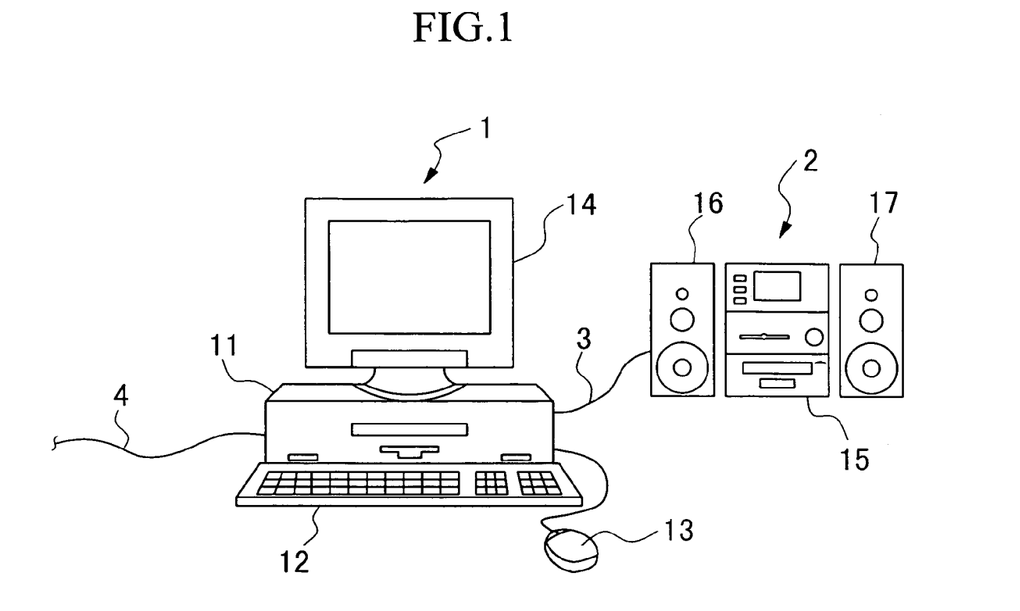
FIG. 1 shows an appearance of an audio system in accordance with embodiment of the invention.

FIG. 1 shows an appearance of an audio system in accordance with the embodiment of the invention.

The audio system of FIG. 1 is configured by a personal computer 1, an audio device 2 such as an audio component stereo sound system, which are connected together by a single serial bus cable 3 and its interface(s). The personal computer 1 is capable of linking with networks such as Internet and LAN (i.e., Local Area Network) by way of a communication line 4. Audio data and control data are transmitted in a bidirectional manner between the personal computer 1 and the audio device 2 by way of the serial bus cable 3. As the serial bus, it is preferable to use the USB (i.e., Universal Serial Bus). Or, it is possible to use other serial buses such as IEEE 1394 serial bus (i.e., a serial interface for computer networks, where "IEEE" is an abbreviation for "Institute of Electrical and Electronics Engineers"), for example. In addition, it is possible to use different cables for transmission of the control data and audio data respectively. For example, a RS-232C cable is used for transmission of the control data, while SPDIF (i.e., normal digital interface such as optical cable) is used for transmission of the audio data.

The personal computer 1 is configured by a main body 11 containing a CPU (not shown), a keyboard 12, a mouse 13 and a display unit 14, which displays operation panels for manipulation of the audio device 2. The audio device 2 is configured by a main body unit 15 containing a tuner, a (CD) player and an amplifier as well as left/right loudspeakers 16, 17.

Figure 2:
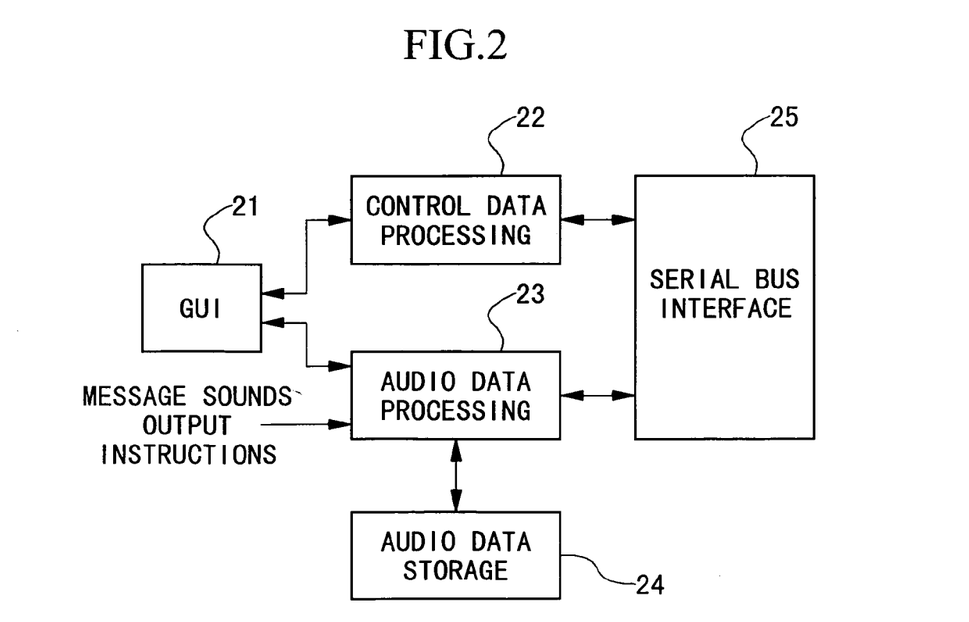
FIG. 2 is a function block diagram showing blocks used for audio control made by a personal computer shown in FIG. 1.

FIG. 2 is a function block diagram showing functions (or operations) regarding audio control of the personal computer 1.

The personal computer 1 is configured by hardware as well as software such as OS (i.e., operating system) and application programs. Thus, the personal computer 1 is configured by a GUI unit 21 (where "GUI" is an abbreviation for "Graphical User Interface"), a control data processing unit 22, an audio data processing unit 23, an audio data storage unit 24 and a serial bus interface (I/F) 25. The GUI unit 21 displays on a screen of the display unit 14 necessary operation panels, which are required to perform all of the operations of the audio device 2 by the personal computer 1. In addition, the GUI unit 21 performs processing to accept inputs from input devices such as the mouse 13.

Figure 3A:
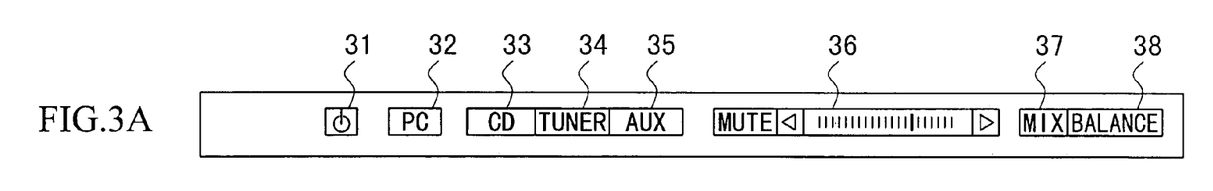
FIG. 3A shows an example of an operation panel which is displayed on a screen of a display unit of the personal computer shown in FIG. 1.
Figure 3B:
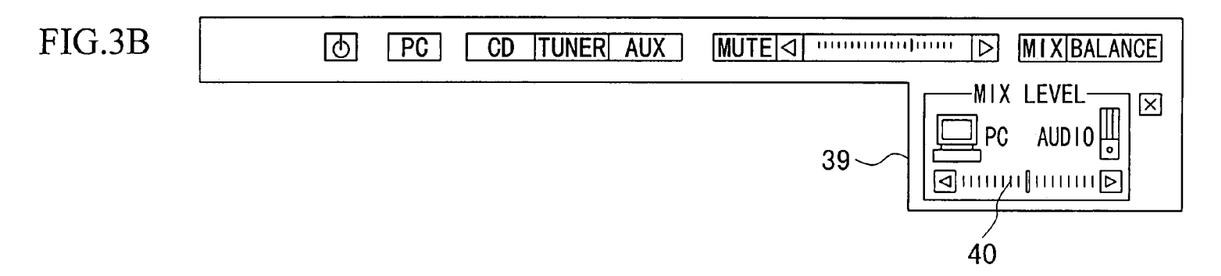
FIG. 3B shows an example of a pull-down panel which appears on the screen when MIX is designated.
Figure 3C:
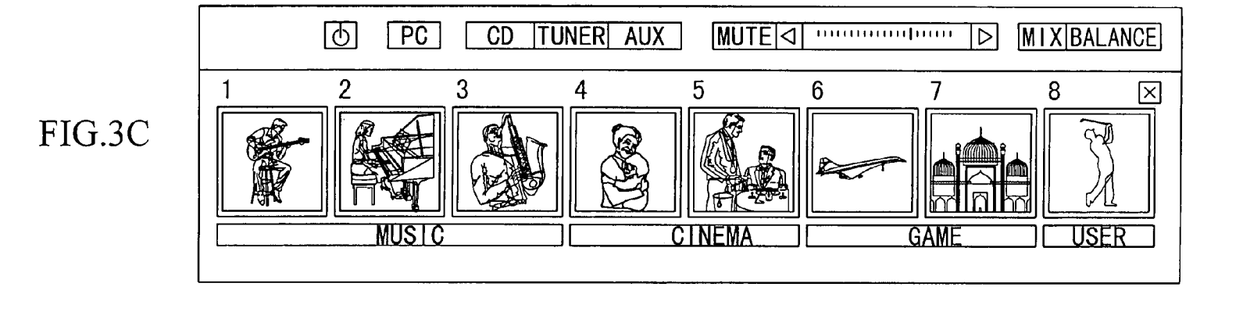
FIG. 3C shows another example of the operation panel which shows sound field images for sound field control in addition to switches and sections of the operation panel of FIG. 3A.

FIG. 3A, FIG. 3B and FIG. 3C show an example of operation panels.

The operation panel of FIG. 3A contains five switches and three sections for adjustments, all of which can be selected and manipulated by click operations of the mouse 13. Specifically, the operation panel provides a power switch 31 for ON/OFF control of power to the audio device 2, a PC switch 32 for selection of audio sources, a CD switch 33, a TUNER switch 34 and an AUX switch 35. In addition, the operation panel provides a MUTE adjuster 36 for adjustment of mute level, a MIX adjuster 37 for adjustment of mixing level established between the personal computer 1 and other audio sources, and a balance adjuster 38 for adjustment of tone volume balance between the loudspeakers 16 and 17.

When a user clicks the mouse 13 to designate the switch 33, 34 or 35 for selection of CD, TUNER or AUX as audio source, audio data given from the personal computer 1 are output by way of a mixing circuit, which will be described later. If the user clicks the mouse 13 to designate the MIX adjuster 37, a mixing level adjustment panel 39 shown in FIG. 3B is provided in a pull-down manner. Herein, by manipulating the mouse 13 to operate a control bar 40, it is possible to adjust a tone-volume ratio between the personal computer 1 and other audio source.

Using the benefits of the operation panels provided by the GUI unit 21, it is possible to perform a variety of setting operation by using graphic images. For example, FIG. 3C shows sound field images for sound field control, which are displayed in addition to the aforementioned switches and sections of the operation panel of FIG. 3A. Using those sound field images, it is possible to perform the setting of the desired sound field in an extremely easy way. When the user selects CD, it is possible to display an image representing information such as designation of a CD within CDs stored in a CD tray and a presently reproduced part of audio data recorded on the designated CD. Thus, the user is capable of confirming such information with ease.

Of course, the audio device 2 is capable of being equipped with the aforementioned operation panel(s). However, there is a limit in provision of the image display. Because the personal computer 1 is capable of performing a variety of operations, it may be preferable to provide the audio device 2 with a limited number of operation switches used for basic functions only.

Based on operation information representing the operation(s) which is performed using the GUI unit 21, the control data processing unit 22 creates control data for operating the audio device 2. The control data are transmitted to the audio device 2 via the serial bus interface 25. In order to match operations made by the audio device 2 with contents of the operation panels of the personal computer 1, contents of the operations are reflected in the operation panels provided by the GUI unit 21 on the basis of control data given from the audio device 2.

The personal computer 1 selected by the GUI unit 21 provides the audio data processing unit 23 with output instructions such as the music stored in the personal computer 1 as well as the start/end sounds, alarm sound, inquiry sound and mail reception sound (hereinafter, all referred to as message sounds). So, the audio data processing unit 23 selects necessary audio data from the audio data storage unit 24 on the basis of the output instructions given from the personal computer 1. Then, the audio data processing unit 23 converts them to suit a digital data form which can be subjected to transmission. Thus, it outputs them to the audio device 2 via the serial bus interface 25.

Figure 4:
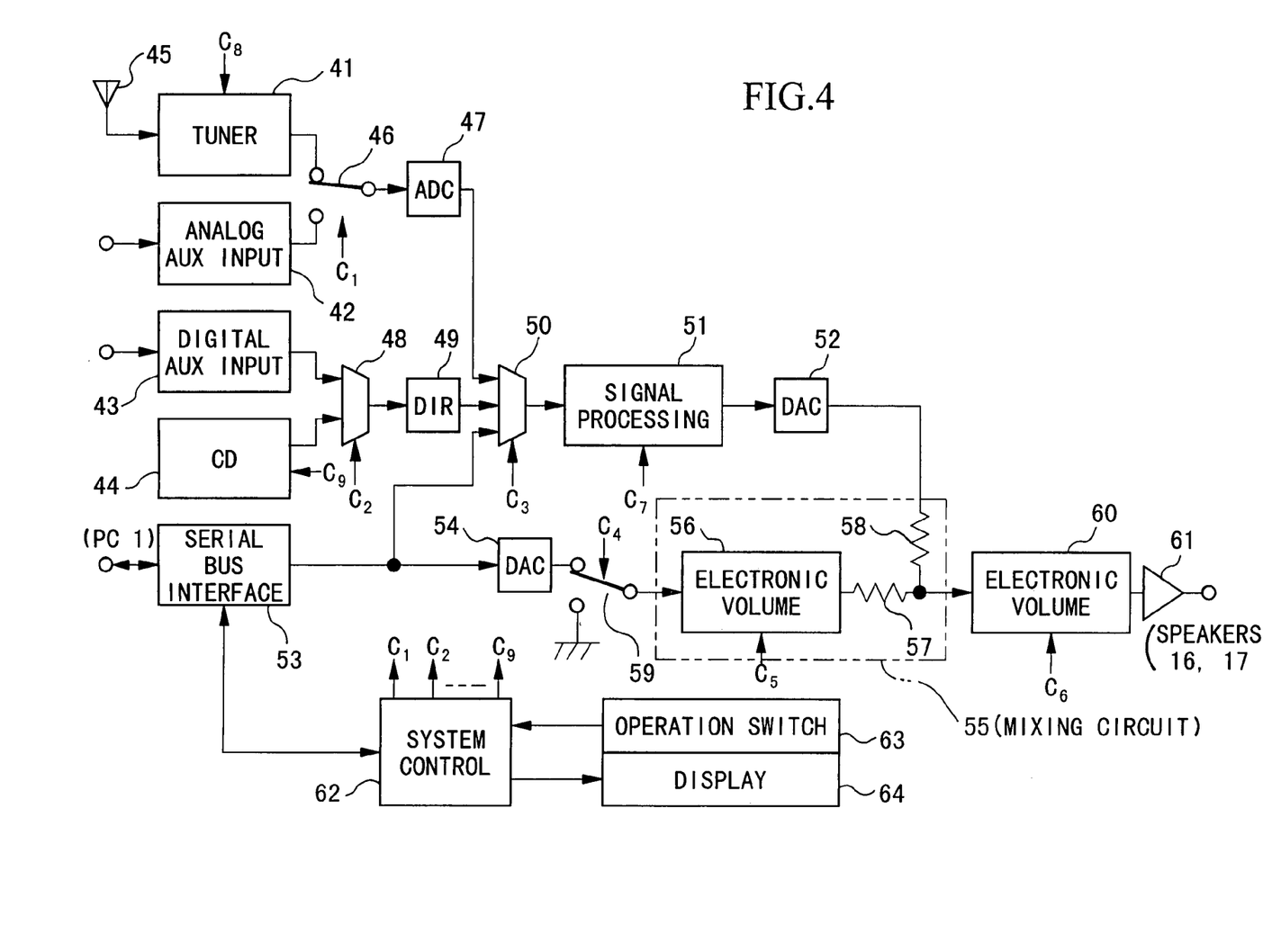
FIG. 4 is a block diagram showing an example of a configuration of an audio device shown in FIG. 1.

FIG. 4 is a block diagram showing a configuration of a main body of the audio device 2.

As audio sources, the audio device 2 is equipped with a tuner unit 41, an analog AUX input unit 42, a digital AUX input unit 43 and a CD unit 44. The tuner unit 41 extracts signals of a desired channel from AM/FM signals received by an antenna 45. The tuner unit 41 and the analog AUX input unit 42 output respective analog audio signals, one of which is selected by a switch 46 and is converted to digital signals by an analog-to-digital converter 47 (abbreviated by A/D converter or ADC). The digital AUX input unit 43 and the CD unit 44 output respective digital audio data, one of which is selected by a multiplexer (abbreviated by MPX or MUX) 48 and is input to a digital interface receiver (abbreviated by DIR) 49. The digital interface receiver (DIR) 49 reproduces clock signals from the digital audio data input thereto. Using the reproduced clock signals, the digital interface receiver 49 extracts certain data from the input digital audio data. In addition, it separates control bits from the extracted data. Incidentally, the digital interface receiver 49 verifies the sampling frequency (and other parameters) so as to make determination as to whether the input data are reliable ones or not.

Output of the A/D converter 47 and output of the digital interface receiver 49 are subjected to selection made by a multiplexer 50, an output of which is then forwarded to a signal processing block 51. In other words, one of the digital audio data given from the A/D converter 47 and the digital interface receiver 49 respectively is selected and supplied to the signal processing block 51. The signal processing block 51 performs a graphic equalizer process and a sound field control process on the selected digital audio data. Then, the processed digital audio data are converted to analog signals by a digital-to-analog converter (abbreviated by D/A converter or DAC) 52. The aforementioned circuit elements that range from the audio sources to the D/A converter 52 configure a first system portion of the audio system of the present embodiment.

Audio data and control data, which are given from the personal computer 1 via the serial bus cable 3 are input to a serial bus interface unit 53 shown in FIG. 4. The serial bus interface unit 53 separates the audio data and control data from the input data thereof. In the case where the serial bus corresponds to the universal serial bus (USB), a data format is constructed using a frame of 1 milli-second as a basic unit thereof. By detecting a start-of-frame (SOF), it is possible to extract its following frames. Thus, it is possible to separate the audio data and control data. In the case where the serial bus corresponds to the IEEE 1394 serial bus, it is possible to separate the audio data and control data by detecting self-ID packet which starts by codes of "10".

The separated audio data are subjected to digital-to-analog conversion by a D/A converter 54. The aforementioned circuit elements such as the serial bus interface unit 53 and the D/A converter 54 construct a second system portion of the audio system. Outputs of the D/A converters 52 and 54 are subjected to mixing performed by a mixing circuit 55. The mixing circuit 55 is configured by an electronic volume 56, resistors 57 and 58. Herein, the electronic volume 56 performs adjustment of a tone volume with respect to analog signals given from the D/A converter 54, while the resistors 57 and 58 are provided for analog addition. A switch 59 is provided prior to the electronic volume 56 in such a way that the second system portion is subjected to analog mute and is placed in a mixing-off state. Output of the mixing circuit 55 is forwarded to an electronic volume 60 which adjusts master volume and is then output to the loudspeakers 16 and 17 via an amplifier 61.

Incidentally, the audio data separated by the serial bus interface unit 53 are selectively supplied to the first system portion as well via the multiplexer 50.

The control data separated by the serial bus interface unit 53 are supplied to a system control unit 62. Thus, the system control unit 62 produces control signals C1, C2, . . . , C9 based on the foregoing operation information made by the GUI unit 21 of the personal computer 1. The control signals C1, C2 and C3 are supplied to the switch 46, multiplexer 48 and multiplexer 50 respectively. Thus, those control signals are used for selection of the audio source, which is designated. The control signal C4 is supplied to the switch 59, so that mixing is turned off in the case where the personal computer 1 is selected as the audio source. The control signals C5 and C6 control the electronic volumes 56 and 60 respectively. Further, the control signal C7 represents signal processing selection information for the signal processing block 51; the control signal C8 represents channel selection information for the tuner unit 41; and the control signal C9 represents selection information for the CD unit 44. Incidentally, operation switches 63 equipped in the audio device 2 are capable of supplying control data to the system control unit 62. Herein, contents of operations of the operation switches 63 are displayed by a display 64 as well.

When the CD is selected as the audio source, the multiplexer 48 selects output of the CD unit 44, while the multiplexer 50 selects output of the digital interface receiver 49. At this time, the switch 59 operates to establish connection between the D/A converter 54 and the mixing circuit 55. So, when the personal computer 1 supplies the audio device 2 with a message sound while the user listens to sounds of the CD, the mixing circuit 55 mixes the message sound and CD sounds, which are produced by the speakers 16 and 17.

When the personal computer 1 is selected as the audio source, the multiplexer 50 selects the serial bus interface unit 53. Audio data given from the personal computer 1 are digital data, which have no deterioration in sound quality. In addition, the signal processing block 51 performs the graphic equalizer process and sound field process on the audio data. Therefore, it is possible for the user to appreciate the music of good quality. By the way, the personal computer 1 is equipped with a CD-ROM unit, which is capable of reproducing a CD used for the music. In that case, digital data reproduced from the CD are transmitted to the audio device 2 via the serial bus interface unit 53. Thus, it is possible to reproduce sounds of the music CD in a completely same manner that the audio component stereo system reproduces the music CD by itself. Incidentally, it is possible to make the setting of the personal computer 1 such that the message sounds (e.g., alarm sound and mail receipt sound) supplied from the personal computer 1 are adequately convoluted into the audio data with ease. Those sounds are naturally produced by the speakers 16 and 17. Therefore, the audio system of the present embodiment is capable of avoiding an event that the user cannot hear the message sounds while listening to other audio sounds. In the aforementioned case where the message sounds are convoluted into the audio data, the switch 59 operates to disconnect the D/A converter 54 from the mixing circuit 55. As described before, the audio signals output from the first system portion are subjected to signal processing such as the sound field process, while the audio signals output from the second system portion are not been subjected to such signal processing but are subjected to simple digital-to-analog conversion. In the above case, it is possible to avoid an event that the audio signals of the first system portion are mixed with the audio signals of the second system portion. So, the present embodiment does not suffer from inconveniences such as jamming. In addition, the present embodiment is capable of effectively utilizing signal processing of a further high quality.

Figure 5:
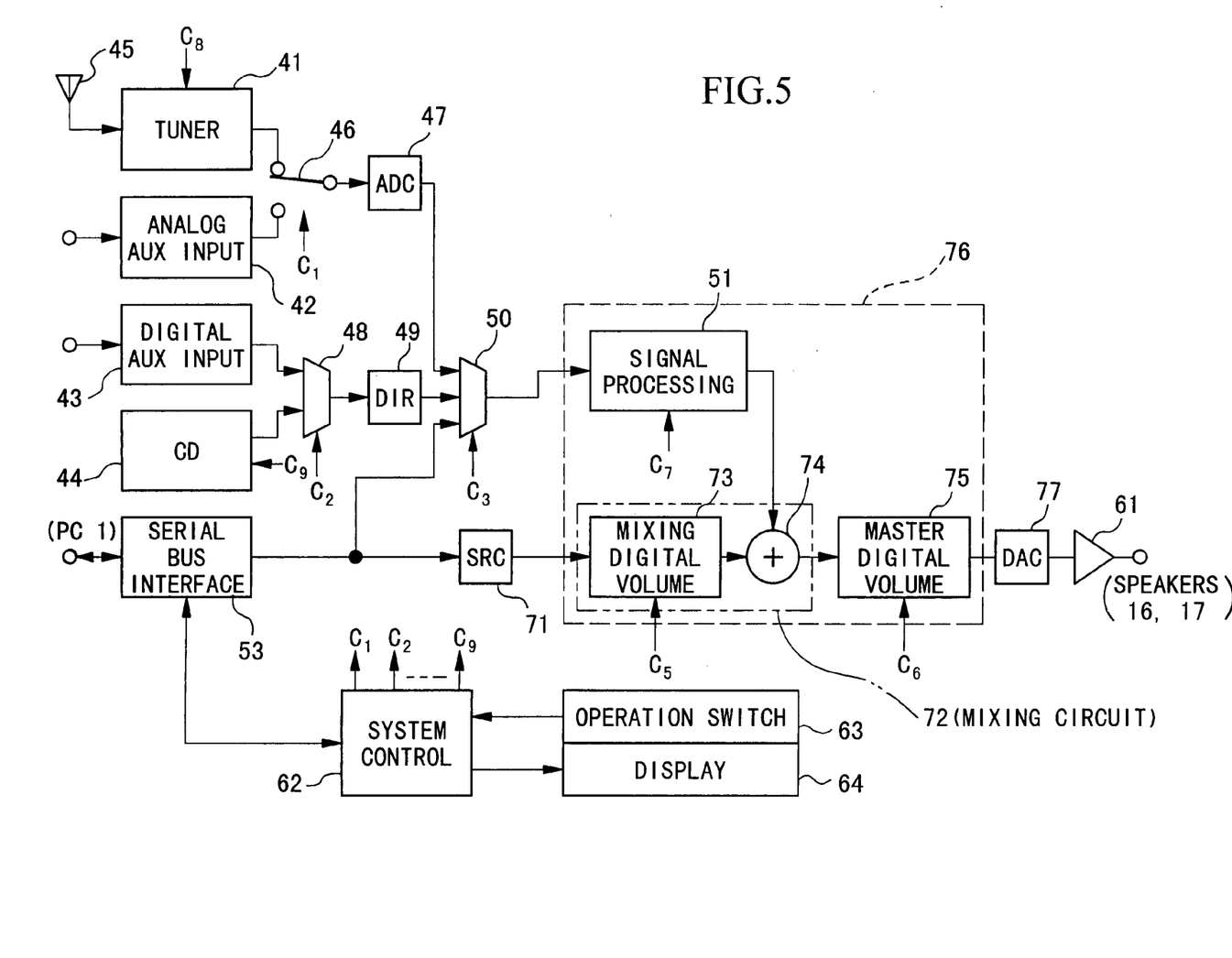
FIG. 5 is a block diagram showing another example of the configuration of the audio device.

Incidentally, the present embodiment is designed to perform "analog" mixing. Of course, it is possible to modify the present embodiment to perform "digital" mixing using digital data. FIG. 5 is a block diagram showing a modified configuration of the audio device 2 that actualizes the digital mixing.

In the case of FIG. 5, it is necessary to make adjustments on sampling parameters such as sampling rates and sampling timings at input and output of the signal processing block 51. For this reason, output of the serial bus interface unit 53 is supplied to a sampling rate comparator (abbreviated by "SRC") 71, wherein it is subjected to frequency adjustment and synchronization adjustment. Then, a mixing circuit 72 performs mixing between output of the sampling rate comparator 71 and output of the signal processing block 51. The mixing circuit 72 is configured by a mixing digital volume 73 and an adder 74. The mixing circuit 72 is followed by a master digital volume 75. The foregoing signal processing circuit 51, mixing circuit 72 and master digital volume 75 are all designed as digital circuits. Therefore, it is possible to configure them in a form of a single signal processing block 76. Output of the master digital volume 75 is subjected to digital-to-analog conversion by a D/A converter 77, output of which is then supplied to the speakers 16, 17 via the amplifier 61.

As the audio device 2, the present embodiment employs an audio component stereo system of an integrated type, which incorporates a variety of sources therein. Of course, it is possible to employ single component units respectively. Or, it is possible to employ an amplifier-incorporated speaker (or so-called PC speaker), which has a serial bus terminal and an external input terminal.

Lastly, effects of the invention will be described as follows:

(1) The audio system of the invention is constructed by a personal computer and an audio device, which are connected together by way of a serial bus. Herein, the audio device performs mixing between audio data of the personal computer and audio data given from an audio source differed from the personal computer. Therefore, the user is capable of hearing contents of the audio data of the personal computer representing message sounds such as alarm sound and mail reception sound while listening to sounds of the audio source.

(2) The audio device of the audio system is designed to contain a first system portion and a second system portion. Herein, the first system portion provides the high-class digital audio processing such as the equalizing process and hall sound field imparting control process, while the second system portion provides only the simple processing such as the digital-to-analog conversion, for example. The audio data of the personal computer can be supplied to either the first system portion or second system portion. So, even when the first system portion selects the audio source other than the personal computer, in other words, even when the first system portion does not process the audio data of the personal computer, the user is capable of hearing the message sounds, which are subjected to mixing from the second system portion. If the audio data of the personal computer represent musical tone data having a high sound quality that is equivalent to the CD and the like, the first system portion selects the personal computer as the audio source so that the sound processing of high precision is performed on the audio data of the personal computer in a manner similar to sound processing for the other audio source. In that case, the user is capable of hearing the message sounds processed in the first system portion. So, the mixing effected between outputs of the first and second system portions are prohibited, so that only the processing system of a higher quality (i.e., first system portion) is effectively utilized. In addition, it is possible to avoid unexpected inconveniences such as the jamming.

(3) The personal computer is capable of displaying operation panels. So, control data are produced based on operations of the operation panels and are transmitted via the serial bus to control operations of the audio device. Or, the personal computer receives information regarding operations made by the audio device, which is then reflected in contents of the operation panels. So, even if the audio device is located far from the personal computer, the personal computer is capable of performing all of the operations made by the audio device. Thus, it is possible to improve handling extremely well in audio control. In addition, all the operations made by the audio device are reflected in contents of the operation panels of the personal computer. Therefore, there is no inconsistency in operations between the personal computer and audio device.

(4) This invention is applicable to the audio component stereo system, which incorporates the AM/FM tuner and player for CD (compact disk), MD (mini disk), DAT (digital audio tape) etc. In addition, this invention is applicable to the so-called PC speaker that is constructed by the amplifier and speaker(s).

(5) The contents of the audio system of this invention are described as the audio control program. The audio control program can be provided for the user in a form of the recording media such as the CD and floppy disk(s), or it can be provided using communications from the host computer, for example. The audio control program is basically designed to include software elements as follows:
  (i) Graphical user interface (GUI), which is provided on the display of the personal computer to control operations of the audio device such as the selection of the audio source and the mixing for the audio data of the selected audio source and audio data of the personal computer;
  (ii) Process that control data are produced based on operations made by the graphical user interface and are output to the audio device; and
  (iii) Process that information regarding the operations made by the audio device is received and is reflected in contents of the graphical user interface.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. An audio reproduction method adapted to a personal computer connected with an audio device, comprising:
   receiving first audio data from an audio data source at an audio device;
   receiving second audio data from the personal computer at the audio device;
   performing mixing of the first audio data and the second audio data when the audio data source is selected as a selected audio source at a graphical user interface of the personal computer; and
   inhibiting mixing of the first audio data and the second audio data from being performed when the personal computer is selected as the selected audio source at the graphical user interface of the personal computer.

2. The method of claim 1, wherein the selected audio source is a CD-ROM device.

3. The method of claim 1, wherein the selected audio source is a tuner.

4. The method of claim 1, wherein the personal computer is connected to the audio device via a serial bus cable.

5. The method of claim 1, further including selecting a volume for the mixing at the graphical user interface of the personal computer.

6. The method of claim 1, further including selecting a balance at the graphical user interface of the personal computer, the selecting of the balance adjusting a tone volume balance between a plurality of speakers.

7. The method of claim 1, further including selecting a mixing level at the graphical user interface of the personal computer between the personal computer and the selected audio source.

8. The method of claim 1, further including selecting a sound field image, in order to set up a sound field, at the graphical user interface of the personal computer.

9. The method of claim 1, wherein the selected audio source is a device connected to an AUX input.

10. A system for audio reproduction, comprising:
    an audio source for transmitting first audio data;
    a personal computer for transmitting second audio data; and
    an audio device to receive the first audio data and the second audio date, wherein mixing of the first audio data and the second audio data is performed when the audio source is selected as a selected audio source at a graphical user interface of the personal computer and mixing of the first audio data and the second audio data is inhibited when the personal computer is selected as the selected audio source at the graphical user interface of the personal computer.

11. The system of claim 10, wherein the audio source is a CD player.

12. The system of claim 10, wherein the audio source is a tuner.

13. The system of claim 10, wherein the personal computer is connected to an audio device by a serial bus cable.

14. The system of claim 10, wherein the audio source is connected to an AUX switch.

15. The system of claim 10, further including a MUTE adjuster on the graphical user interface for adjusting a mute level of the audio device.

16. The system of claim 10, further including a mix adjuster on the graphical user interface for adjusting a mixing level between the personal computer and the selected audio source.

17. The system of claim 10, further including a balance adjuster on the graphical user interface for adjusting a tone volume balance between a plurality of speakers connected to the audio device.

18. The system of claim 10, further including at least one sound field image, which when selected allows a set up of a desired sound field.

* * * * *